United States Patent [19]

Listemann et al.

[11] Patent Number: 5,508,314

[45] Date of Patent: Apr. 16, 1996

[54] HYDROXYL GROUP-CONTAINING BLOWING CATALYST COMPOSITIONS FOR THE PRODUCTION OF POLYURETHANES

[75] Inventors: Mark L. Listemann, Whitehall; Kevin R. Lassila; Kristen E. Minnich, both of Allentown; Ann C. L. Savoca, Bernville, all of Pa.

[73] Assignee: Air Products and Chemicals, Inc., Allentown, Pa.

[21] Appl. No.: 198,804

[22] Filed: Feb. 18, 1994

[51] Int. Cl.$^6$ .............................. C08J 9/10; C08G 18/18
[52] U.S. Cl. ........................ 521/115; 521/116; 521/118; 521/129; 521/155; 521/170
[58] Field of Search .................................. 521/129, 155, 521/170, 115, 116, 118

[56] References Cited

U.S. PATENT DOCUMENTS

| | | |
|---|---|---|
| 3,836,488 | 9/1974 | Pruitt et al. . |
| 4,026,840 | 5/1977 | Bechara et al. . |
| 4,143,003 | 3/1979 | Haas et al. . |
| 4,338,408 | 7/1982 | Zimmerman et al. . |
| 4,433,170 | 2/1984 | Zimmerman et al. . |
| 4,957,944 | 9/1990 | Schiffauer et al. . |
| 5,039,713 | 8/1991 | Petrella . |
| 5,064,957 | 11/1991 | Nakasugi . |
| 5,071,809 | 12/1991 | Casey et al. . |
| 5,091,583 | 2/1992 | Casey et al. . |
| 5,229,430 | 7/1993 | Tamano et al. ................ 521/129 |
| 5,315,041 | 5/1994 | Abe et al. ..................... 521/129 |
| 5,324,773 | 6/1994 | Mafoti et al. .................. 521/129 |

FOREIGN PATENT DOCUMENTS 0469545 2/1992 European Pat. Off. .
4202428 11/1993 Japan .

*Primary Examiner*—James J. Seidleck
*Assistant Examiner*—John M. Cooney, Jr.
*Attorney, Agent, or Firm*—Michael Leach; William F. Marsh

[57] ABSTRACT

A method for preparing a polyurethane foam which comprises reacting an organic polyisocyanate and a polyol in the presence of a blowing agent, cell stabilizer and a catalyst composition consisting essentially of at least one of the permethylated mono- and dialkylene oxide adducts of tris(2-aminoethyl)amine of structures I, II and III, or any combination thereof

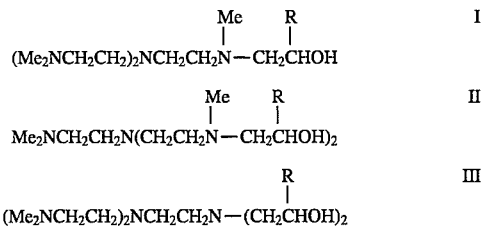

wherein
R is hydrogen, a $C_1$–$C_4$ alkyl, $C_6$–$C_8$ aryl, or $C_7$–$C_9$ aralkyl group.

10 Claims, No Drawings

HYDROXYL GROUP-CONTAINING BLOWING CATALYST COMPOSITIONS FOR THE PRODUCTION OF POLYURETHANES

TECHNICAL FIELD

The present invention relates to the use of hydroxyl-containing tertiary amines as catalysts for producing polyurethanes.

BACKGROUND OF THE INVENTION

Polyurethane foams are widely known and used in automotive, housing and other industries. Foam is generally referred to as rigid, microcellular or flexible. Typically, in the preparation of polyurethane foams, a tertiary amine catalyst is used to accelerate the reaction of the polyisocyanate with water to generate carbon dioxide as a blowing agent and to accelerate the reaction of polyisocyanate with polyols to promote gelling of the reaction. Tertiary amines generally are malodorous and offensive and many have high volatility due to low molecular weight. Release of tertiary amines during foam processing may present significant safety and toxicity problems, and release of residual amines from consumer products is generally undesirable.

Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents. Examples of such structures are included in the following references: U.S. Pat. Nos. 4,957,944; 5,071,809 and 5,091,583.

Secondary alcohols are preferred in the structures, because these catalysts exhibit a desirable balance between their promotion of the active hydrogen-isocyanate reactions and their own reactivity with isocyanates. In contrast, catalysts which contain primary alcohols react rapidly with isocyanates and thus high use levels are required. Catalysts which contain tertiary hydroxyls react slowly with isocyanates, but the urethanes of tertiary hydroxyls which are formed have poor thermal stability. These urethanes may degrade and release the catalyst at temperatures substantially below the decomposition temperature of the foam itself. The free amine could then accelerate foam decomposition.

A catalyst which strongly promotes the water-isocyanate (blowing) reaction is advantageous for the manufacture of many polyurethane foams. Such catalysts include the β-(N,N-dimethylamino)alkyl ethers, in particular bis(dimethylamino)ethyl ether. Low odor, reactive catalysts structurally related to bis(dimethylamino)ethyl ether are described in U.S. Pat. Nos. 4,338,408 and 4,433,170. In particular, 2-[N-(dimethylaminoethoxyethyl)-N-methylamino] ethanol, Texacat® ZF-10 catalyst, is an effective blowing catalyst, albeit less effective than bis(dimethylamino)ethyl ether.

Linear, permethylated di-, tri-, and polyamines are also known to promote the water-isocyanate reaction.

U.S. Pat. No. 3,836,488 discloses the use of tris[2-(dimethylamino)ethyl]amine as a catalyst for making urethanes by reacting polyisocyanate with active hydrogen containing compounds.

U.S. Pat. No. 4,143,003 discloses a process for the production of polyurethane foam resins in which linear polyamines containing at least 4 tertiary nitrogen atoms are used as catalysts. Such catalysts include hexamethyltriethylenetetramine and heptamethyltetraethylenepentamine.

U.S. Pat. No. 5,039,713 discloses a blowing catalyst consisting essentially of 25 to 80 wt % pentamethyldiethylenetriamine and 20 to 75 wt % bis(dimethylaminopropyl)methylamine.

U.S. Pat. No. 4,026,840 discloses that the reaction of isocyanate with polyols to form polyurethanes and their polymerization to polyisocyanurates are promoted by certain hydroxyalkyl tertiary amine catalysts corresponding to the formula:

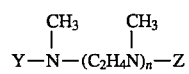

wherein
Y is $CH_3$ or Z,
Z is $-CH_2CH_2OH$, and
n is 1 or 2.

EP 0 469 545 A2 (U.S. Pat. No. 5,229,430) discloses an amine catalyst for producing polyurethane comprising a compound of the general formula:

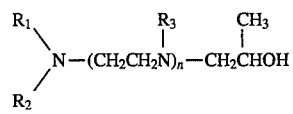

wherein
$R_1$, $R_2$ and $R_3$ respectively and independently are alkyl groups having 1 to 3 carbon atoms, and
n is an integer from 0 to 3.

The amine catalyst has a secondary hydroxyl group in the molecule and is claimed to be non-bleeding in the polyurethane resin.

Alkylene oxide adducts of polyamines are also used as polyols for the production of polyurethanes.

U.S. Pat. No. 5,064,957 discloses the hexakis propylene oxide adduct of tris(2-aminoethyl)amine as a precursor to a morpholine-containing polyurethane catalyst, but the propylene oxide adduct itself is not noted as having catalytic activity.

SUMMARY OF THE INVENTION

The present invention provides a composition for catalyzing the trimerization of an isocyanate and the reaction between an isocyanate and a compound containing a reactive hydrogen, e.g., the blowing reaction and the urethane reaction for making polyurethane. The catalyst composition consists essentially of the permethylated mono- and/or dialkylene oxide adducts of tris(2-aminoethyl)amine.

These hydroxy-functional branched tertiary amines strongly promote the water-isocyanate (blowing) reaction and are subsequently incorporated into the polyurethane product. Surprisingly, the hydroxy-functional branched tetramine offers selectivity to the blowing reaction superior to that of the linear tetramine.

The catalyst composition may comprise mixtures of the permethylated monoalkylene oxide adduct and the permethylated dialkylene oxide adducts of tris(2-aminoethyl)amine. These mixtures may also contain permethylated alkylene oxide adducts of linear triethylenetetramine, as well as hydroxy-functional piperazine derivatives.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, namely the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A general polyurethane flexible foam formulation having a 1–3 lb/ft$^3$ (16–48 kg/m$^3$) density (e.g., automotive seating) containing a gelling catalyst such as triethylenediamine (TEDA) and a blowing catalyst such as the catalyst composition according to the invention would comprise the following components in parts by weight (pbw):

| Flexible Foam Formulation | pbw |
|---|---|
| Polyol | 20–80 |
| Polymer Polyol | 80–20 |
| Silicone Surfactant | 1–2.5 |
| Blowing Agent | 2–4.5 |
| Crosslinker | 0.5–2 |
| Catalyst | 0.5–2 |
| Isocyanate Index | 70–115 |

The catalyst composition consists essentially of any one of the permethylated mono- and dialkylene oxide adducts of tris(2-aminoethyl)amine of structures I, II and III, or any combination thereof:

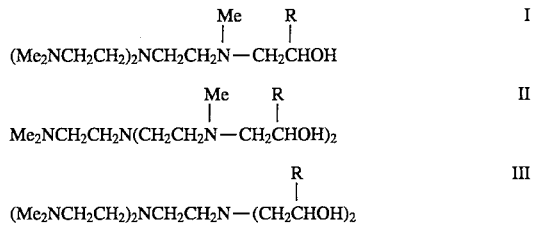

wherein

R is hydrogen, a $C_1$–$C_4$ alkyl, $C_6$–$C_8$ aryl, or $C_7$–$C_9$ aralkyl group.

R is preferably hydrogen or alkyl, especially methyl.

The compounds of structures I, II and III can be prepared by reacting tris(2-aminoethyl)amine with an alkylene oxide of the formula

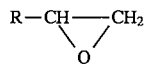

where R is as defined above, preferably hydrogen, methyl, ethyl or phenyl, and especially methyl. The alkylene oxide and tetramine are reacted in relative molar amounts of 10:1 to 1:10, in inert solvents such as toluene or preferably as solventless reactions, at temperatures from 20° to 120° C. and pressures ranging from atmospheric to autogenous.

Mixtures of compounds I, II and III are contemplated to be within the scope of the invention. Such mixtures may also contain permethylated alkoxylates of linear triethylenetetramine, as well as hydroxy-functional piperazine derivatives. Effectiveness of the mixtures is maximized by maximizing the content of compounds I, II and III and most preferably, by maximizing the content of compound I. Permethylated dialkoxylates of the linear triethylenetetramine (analogous to compounds II and III) are also preferred components of the mixture.

A catalytically effective amount of the catalyst composition is used in the polyurethane formulation. More specifically, suitable amounts of the catalyst composition may range from about 0.01 to 10 parts per 100 parts polyol (phpp) in the polyurethane formulation.

The catalyst composition may be used in combination with other tertiary amine, organotin and carboxylate urethane catalysts well known in the urethane art.

These catalyst compositions afford activity and blowing selectivity superior to those of other hydroxy-functional blowing catalysts. Unexpectedly, the branched tetramine offers selectivity superior to that of the linear tetramine. The permethylated dialkoxylates of triethylene-tetramine are also unexpectedly effective at enhancing blowing selectivity.

EXAMPLE 1

N,N-Bis(2-dimethylaminoethyl)-N'-(2-hydroxypropyl)-N'-methyldiaminoethane (Me$_5$TAEA-PO)

Tris(2-aminoethyl)amine (1000 mL, 6.69 moles) was heated to 55° C. in a 2 L round-bottomed flask. The flask was fitted with a thermometer and reflux condenser. Propylene oxide (467 mL, 6.69 moles) was added in 25 mole % increments using a piston pump set at 200 mL/hr. There was a 20° C. exotherm with each PO addition. The temperature was allowed to return to 55°–60° C. before the next increment of PO was added. Distillation through a 6 foot (1.83 m) Propack® column at a head temperature of 100° C. and pressure of 2.6 mm Hg afforded unreacted tris(2-aminoethyl)amine. The monopropoxylate distilled at a head temperature of 145° C. and pressure of 6.5 mm Hg. The pot contained di- and tripropoxylated material.

Monopropoxylated tris(2-aminoethyl)amine, 145 g, 0.71 mole, palladium on carbon hydrogenation catalyst, 8.0 g, and water, 150 mL, were charged to a 1 liter stainless steel autoclave. The reactor was sealed and purged three times with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5515 kPa). An HPLC pump was primed and attached to the reactor. The pump was used to add 314 g of Formalin® reagent (37% formaldehyde in water) to the reactor at 3 mL/min. The reaction was complete when the hydrogen uptake stopped. After the reaction, water was pumped into the reactor to rinse the formaldehyde from the feed lines. The hydrogen feed was shut off and the reactor was cooled. It was then vented and purged with nitrogen. The catalyst was removed by filtering through Celite® filter aid.

Water was removed from the filtrate at atmospheric pressure. Distillation at a pot temperature of 185° C., head temperature of 109° C., a pressure of 1.7 mm Hg and a reflux ratio of 3:1 afforded 23g of 97+% pure material (compound I) from the original charge of 400 g of tris(2-aminoethyl)amine monopropoxylate.

I (Me$_2$NCH$_2$CH$_2$)$_2$NCH$_2$CH$_2$N—CH$_2$CHOH with Me, Me on N

COMPARATIVE EXAMPLE 2

N-(2-Hydroxypropyl)-N,N',N'',N''',N''''-pentamethyl-triethylenetetramine (M$_5$TETA-PO)

Triethylenetetramine hydrate (400 g, 2.735 mole) was heated to 60° C. in 1 liter round-bottomed flask. The flask was fitted with a thermometer and a reflux condenser. Propylene oxide (142.5 mL, 2.039 g mole) was added in 25 mole % increments using a piston pump. The reaction was monitored by GC to maximize the yield of monopropoxylate. The unreacted starting material was removed by distillation at 125° C. head temperature, 5 mm Hg. The monopropoxylated product distilled at 160° C. head temperature, 1.5 mm Hg. The monopropoxylated product was an inseparable mixture of triethylenetetramine propoxylated on the terminal nitrogen or on the internal nitrogen in a 2:1 ratio. The pot contained di- and tripropoxylated material.

Monopropoxylated triethylenetetramine (134 g), palladium on carbon (8.02 g) and water (150 g) were charged to a 1 liter stainless steel autoclave. The reactor was sealed and purged three times with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5515 kPa). An HPLC pump was primed and attached to the reactor. The pump was used to add the Formalin® reagent (270 g, 37% formaldehyde in water) to the reactor at 3 mL/minute. When the equivalent amount of formaldehyde was added, the hydrogen uptake stopped, indicating the reaction was complete. After the reaction, water was pumped into the reactor to rinse the formaldehyde from the feed lines. The hydrogen feed was shut off and the reactor was cooled. It was then vented and purged with nitrogen. The catalyst was removed by filtering through Celite® filter aid.

The solution was placed in a 1 liter flask. The water was removed at atmospheric pressure. The material was transferred to a 500 mL flask equipped with a one foot (30.5 cm) Propack® fractionating column. The product distilled at 130° C. head temperature, 5 mm Hg. The product was an inseparable mixture of the permethylated terminal and internal monopropoxylates in a 58:42 ratio (Me$_5$TETA-PO).

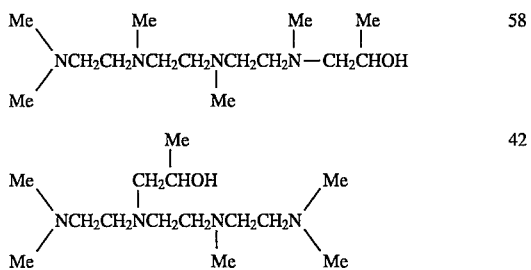

Following a similar procedure, the dipropoxylated triethylenetetramine was reductively methylated to afford an inseparable mixture of isomers collectively designated Me$_4$TETA-2PO.

COMPARATIVE EXAMPLE 3

N-(2-Hydroxypropyl)-N,N',N'',N''-tetramethyl-diethylenetriamine (Me$_4$DETA-PO)

Diethylenetriamine (1000 g, 9.695 mole) was heated to 60° C. in 1 liter round-bottomed flask. The flask was fitted with a thermometer and a reflux condenser. Propylene oxide (510 mL, 7.288 mole) was added in 25 mole % increments using a piston pump. The reaction was monitored by GC to maximize the yield of monopropoxylate. The unreacted starting material was removed by distillation at 85° C. head temperature, 2 mm Hg. The monopropoxylated product distilled at 125° C. head temperature, 2 mm Hg. The monopropoxylated product was an inseparable mixture of terminally and internally monopropoxylated diethylenetriamine in a 4:1 ratio.

Monopropoxylated diethylenetriamine (150 g), palladium on carbon (8.02 g) and water (100 g) were charged to a 1 liter stainless steel autoclave. The reactor was sealed and purged three times with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5515 kPa). An HPLC pump was primed and attached to the reactor. The pump was used to add Formalin® reagent (270 g, 37% formaldehyde in water) to the reactor at 3 mL/minute. When the equivalent amount of formaldehyde was added, the hydrogen uptake stopped, indicating the reaction was complete. After the reaction, water was pumped into the reactor to rinse the formaldehyde from the feed lines. The hydrogen feed was shut off and the reactor was cooled. It was then vented and purged with nitrogen. The catalyst was removed by filtering through Celite® filter aid.

Water was removed from the filtrate at atmospheric pressure. Distillation through a one foot (30.5 cm) Propack® column at a head temperature of 85° C. and pressure of 2 mm Hg afforded the product. The product is an inseparable mixture of the permethylated terminal and internal monopropoxylates in a 78:22 ratio (Me$_4$DETA-PO).

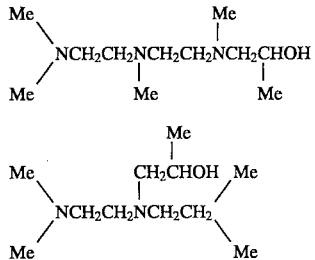

78

22

EXAMPLE 4

A general and quantitative technique for measuring catalyst activity and selectivity is given in this example. Here, the composition of Example 1 is compared with prior art catalysts. The rate of isocyanate consumption as a function of time was measured using a formulation similar to that of Example 5, but containing monofunctional reactants. Reaction samples drawn at the indicated times were quenched with dibutylamine and analyzed by liquid chromatography. The catalysts were compared on an equimolar basis corresponding to a loading of 0.35 pphp DABCO® 33LV catalyst (33 wt % TEDA in DPG) in an actual foam, illustrated by Example 5.

Catalyst selectivity is defined as the ratio of the normalized amount of blowing (urea formation) to the normalized amount of gelling (urethane formation). A selectivity of 1.0 means that the normalized amounts of blowing and gelling are equal at that point in the reaction. A selectivity substantially below 1.0, for example about 0.3, is indicative of a strong gelling catalyst. A selectivity greater than 1.0 is indicative of a blowing catalyst. Table 1 summarizes the results.

TABLE 1

| Catalyst | | Time (min) | | | | | | |
|---|---|---|---|---|---|---|---|---|
| | | 0.5 | 1.0 | 2.0 | 3.0 | 4.0 | 6.0 | 8.0 |
| BDMAEE | Selectivity | 1.30 | 1.31 | 1.16 | 1.07 | 1.01 | 0.96 | 0.90 |
| U.S. Pat. No. 3,330,782 | % NCO Conver | 17.7 | 29.9 | 49.3 | 61.8 | 69.9 | 78.0 | 81.9 |
| ZF-10 | Selectivity | 0.94 | 0.90 | 0.86 | 0.83 | 0.78 | 0.76 | 0.76 |
| U.S. Pat. No. 4,338,408 | % NCO Conver | 17.1 | 27.6 | 44.7 | 55.5 | 62.3 | 70.6 | 75.7 |
| Me$_5$TAEA-PO | Selectivity | 0.89 | 0.95 | 0.94 | 0.90 | 0.87 | 0.81 | 0.81 |
| Ex 1 | % NCO Conver | 13.8 | 26.8 | 48.4 | 60.9 | 67.8 | 74.8 | 79.4 |
| Me$_5$TETA-PO | Selectivity | 0.77 | 0.83 | 0.84 | 0.82 | 0.79 | 0.76 | 0.78 |
| Comp Ex 2 | % NCO Conver | 11.2 | 23.1 | 41.7 | 54.8 | 62.8 | 72.4 | 77.5 |
| Me$_4$DETA-PO | Selectivity | 0.72 | 0.77 | 0.79 | 0.79 | 0.77 | 0.76 | 0.78 |
| Comp Ex 3 | % NCO Conver | 9.0 | 19.8 | 34.1 | 47.5 | 56.5 | 66.4 | 72.1 |
| TMAEPA | Selectivity | 0.63 | 0.68 | 0.68 | 0.70 | 0.71 | 0.73 | 0.71 |
| U.S. Pat. No. 4,026,840 | % NCO Conver | 5.8 | 12.1 | 25.8 | 40.1 | 51.4 | 64.0 | 73.0 |

Comparison of BDMAEE with ZF-10 indicates that ZF-10 is less selective for blowing. However, the selectivity of ZF-10 is sufficiently high that it still serves to balance a strongly gelling catalyst such as TEDA. Comparison of Me$_5$TAEA-PO, the preferred catalyst of this invention (Example 1), with ZF-10 demonstrates that by 1.0 min the Me$_5$TAEA-PO is not only more active, but more importantly, more selective for blowing. Thus, Me$_5$TAEA-PO offers performance superior to that of the best available hydroxy-functional blowing catalyst.

In contrast, the linear isomer Me$_5$TETA-PO (Comp Ex 2, formula V below, n=3, R=Me) does not even meet the performance of ZF-10. It was not expected that two isomers would have such different performance. Furthermore, Me$_4$DETA-PO (Comp Ex 3, formula V below, n=2, R=Me) and trimethylaminoethylethanolamine (TMAEPA, formula V below, n=1, R=Me) show intermediate selectivities of 0.6–0.8, comparable to those of Me$_5$TETA-PO. These intermediate selectivities indicate that the blowing and gelling reactions are both catalyzed, but neither is strongly preferred. Note also that the activity (the % NCO conversion) increases from TMAEPA to Me$_4$DETA-PO to Me$_5$TETA-PO, that is, the activity increases as the number of nitrogens per molecule increases. Thus the linear amines of formula V behave as taught in the prior art. Only the branched amine Me$_5$TAEA-PO shows unexpectedly high blowing selectivity.

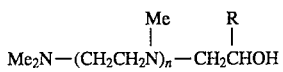   V

EXAMPLE 5

In this example, a polyurethane foam was prepared in a conventional manner. The polyurethane formulation in parts by weight (pbw) was:

| Component | pbw |
|---|---|
| Pluracol 816 | 60 |
| Pluracol 973 | 40 |
| Water | 3.5 |
| Diethanolamine | 1.49 |
| DC 5164 | 1.0 |
| TDI 80 | 105 Index |

Pluracol 816 polyol - a conventional ethylene oxide tipped polyether polyol marketed by BASF.
Pluracol 973 polyol - a styrene-acrylonitrile copolymer filled, ethylene oxide tipped polyether polyol marketed by BASF.
DABCO DC 5164 silicone surfactant marketed by Air Products and Chemicals, Inc.
TDI 80 - a mixture of 80 wt % 2,4-TDI and 20 wt % 2,6-TDI.

The foam reactivity was measured using DABCO® 33LV catalyst as gelling catalyst and either ZF-10 or Me$_5$TAEA-PO as blowing catalysts. For each foam, catalysts (as specified in Table 2) were added to 106 g of the above premix in a 12.7 cm diameter by 25.4 cm tall paper can and the formulation was well mixed for 20 seconds. Sufficient TDI 80 was added to make a 105 index foam [index=(mole NCO/mole active hydrogen)×100] and mixed well for 4 seconds. The foam was allowed to rise freely, monitoring foam height and carbon dioxide evolution with time. Foams were produced in duplicate. Table 2 sets forth conditions and results.

TABLE 2

| Time (sec.) | ZF-10$^a$ | Me$_5$TAEA-PO$^b$ | ZF-10$^a$ | Me$_5$TAEA-PO$^b$ |
|---|---|---|---|---|
| | CO$_2$ evolved (g) | | Foam Height (mm) | |
| 13 | 1.32 | 1.01 | 63.5 | 58.7 |
| 19 | 1.97 | 2.13 | 101.6 | 110.0 |
| 31 | 3.60 | 3.83 | 187.4 | 207.5 |
| 43 | 4.84 | 5.58 | 241.8 | 263.7 |
| 49 | 5.27 | 6.09 | 259.3 | 279.7 |
| 67 | 6.43 | 6.74 | 289.3 | 302.0 |
| 85 | 6.68 | 6.99 | 302.0 | 309.6 |
| 103 | 6.92 | 7.05 | 307.1 | 310.6 |
| 121 | 7.06 | 7.18 | 308.4 | 308.9 |
| 139 | 7.18 | 7.23 | 308.1 | 307.1 |
| 157 | 7.19 | 7.26 | 306.8 | 306.1 |
| 175 | 7.23 | 7.34 | 305.3 | 303.8 |

$^a$catalyzed with 0.4 g 33-LV and 0.22 g (1.15 mmole) ZF-10
$^b$catalyzed with 0.4 g 33-LV and 0.33 g (1.15 mmole) Me$_5$TAEA-PO As these data indicate, the Me$_5$TAEA-PO foam appears to be slightly delayed in CO$_2$ evolution and onset of foam rise. However, after 31 seconds, the Me$_5$TAEA-PO catalyzed foam shows more CO$_2$ evolution and greater volume (as indicated by foam height) than the ZF-10 catalyzed foam. This is consistent with the results given in Table 1, which show that Me$_5$TAEA-PO not only has greater activity than ZF-10, but also greater selectivity for blowing.

EXAMPLE 6

Propoxylation and Reductive Methylation of a Tetramine Mixture

A commercially representative tetramine mixture consisting of approximately 13 mole % tris(2-aminoethyl)amine (TAEA), 63 mole % triethylenetetramine (TETA), and 22 mole % of the piperazine isomers N,N'-bis(2-aminoethyl)piperazine and 2-(2-aminoethyl)aminoethylpiperazine (742 g, 5.1 moles) was heated to 60° C. in a 2 L round-bottomed flask. The flask was fitted with a thermometer and reflux condenser. Propylene oxide (178 mL, 2.5 moles) was added in 25 mole % increments using a piston pump. The unreacted starting material was removed by distillation through a one foot (30.5 cm) Propack® column at a head temperature of 100° C. and 2 mm Hg pressure. Two fractions of propoxylated material were then collected. The first fraction distilled at 155° C., 2 mm Hg, and contained 95% monopropoxylated amines, 4% dipropoxylated amines, and 1% unknowns. The second fraction distilled at 170° C., 2 mm Hg, and contained 77% monopropoxylate, 22% dipropoxylate, and 1% unknowns. The composition of the second fraction is similar to that of the crude propoxylated product following removal of unreacted amine.

Propoxylated tetramine (150 g), palladium on carbon (8.02 g), and water (100 g) were charged to a 1 liter stainless steel reactor. The reactor was sealed and purged three time with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5515 kPa). Formalin® reagent (284 g, 37% formaldehyde in water) was pumped into the reactor at 3 mL/minute. After the reaction, water was pumped into the reactor to rinse the formaldehyde from the feed lines. The reactor was cooled, vented, and the catalyst removed by filtration. Water was removed by distillation at atmospheric pressure, and the product was isolated by Kuglrohr distillation.

The 95% monopropoxylated feed afforded a product designated Tetramine-1, consisting of 17 wt % Me$_5$TAEA-PO, 68 wt % Me$_5$TETA-PO, 12 wt % cyclics, and 3 wt % unknowns.

The 77% monopropoxylated/22% dipropoxylated feed afforded a product designated Tetramine-2, consisting of 8 wt % Me$_5$TAEA-PO, 48 wt % Me$_5$TETA-PO, 14 wt % cyclics, 29 wt % dipropoxylates, and 1 wt % unknowns.

EXAMPLE 7

Comparison of Activity and Selectivity of Tetramine Mixtures

The catalytic properties of the Example 6 mixtures were compared to those of the pure materials from Example 4, Table 1. The selectivities and isocyanate conversions were calculated as described in Example 4.

TABLE 3

| Catalyst | | Time (min) | | | | | | |
|---|---|---|---|---|---|---|---|---|
| | | 0.5 | 1.0 | 2.0 | 3.0 | 4.0 | 6.0 | 8.0 |
| ZF-10 U.S. Pat. No. 4,338,408 | Selectivity | 0.94 | 0.90 | 0.86 | 0.83 | 0.78 | 0.76 | 0.76 |
| | % NCO Conversion | 17.1 | 27.6 | 44.7 | 55.5 | 62.3 | 70.6 | 75.7 |
| Me$_5$TAEA-PO Ex 1 | Selectivity | 0.89 | 0.95 | 0.94 | 0.90 | 0.87 | 0.81 | 0.81 |
| | % NCO | 13.8 | 26.8 | 48.4 | 60.9 | 67.8 | 74.8 | 79.4 |

TABLE 3-continued

| Catalyst | | Time (min) | | | | | | |
|---|---|---|---|---|---|---|---|---|
| | | 0.5 | 1.0 | 2.0 | 3.0 | 4.0 | 6.0 | 8.0 |
| Tetramine-1 Ex 6 | Conversion Selectivity % NCO Conversion | 0.81 13.4 | 0.85 27.0 | 0.86 46.3 | 0.84 58.1 | 0.82 64.1 | 0.81 72.9 | 0.84 78.4 |
| Tetramine-2 Ex 6 | Selectivity % NCO Conversion | 0.87 18.2 | 0.90 36.6 | 0.89 56.2 | 0.86 66.2 | 0.84 71.8 | 0.83 77.6 | 0.85 82.3 |
| Me$_5$TETA-PO Comp Ex 2 | Selectivity % NCO Conversion | 0.77 11.2 | 0.83 23.1 | 0.84 41.7 | 0.82 54.8 | 0.79 62.8 | 0.76 72.4 | 0.78 77.5 |
| Me$_4$TETA-2PO Comp Ex 2 | Selectivity % NCO Conversion | 0.73 12.3 | 0.79 24.4 | 0.81 42.4 | 0.81 55.0 | 0.80 61.9 | — — | 0.83 76.2 |

Tetramine-1 was run at a level (1.33 per g of Me$_5$TAEA-PO) which afforded activity comparable to that of Me$_5$TAEA-PO. Although Tetramine-1 contained ~68 wt % Me$_5$TETA-PO, the 17 wt % Me$_5$TAEA-PO increased the selectivity so that the performance of Tetramine-1 was comparable to that of ZF-10 in the middle to latter stages of the reaction. The selectivity of Tetramine-1 was greater than that of prior art Me$_5$TETA-PO at all points in the reaction. Thus even low levels of Me$_5$TAEA-PO in combination with other tetramines afford effective blowing catalysts.

Tetramine-2 was run at a level (2.18 g per g of Me$_5$TAEA-PO) which afforded activity at 0.5 min comparable to that of ZF-10. By 1 min the selectivity of Tetramine-2 was the same as that of ZF-10, and all subsequent selectivities were higher. Furthermore, while the 0.5 min activities of Tetramine-2 and ZF-10 were within 6% of each other, the 1 and 2 min. activities of Tetramine-2 were 20–25% greater. Tetramine-2 contained only 8 wt % Me$_5$TAEA-PO, yet it is more selective than Tetramine-1, which contained 17 wt % Me$_5$TAEA-PO. The primary difference between Tetramine-1 and Tetramine-2 was that Tetramine-2 contained 29 wt % dipropoxylated material. The final entry in Table 2 shows the performance of TETA dipropoxylate. When run at twice the molar level of Me$_5$TETA-PO, to obtain an activity match, the dipropoxylate was always less selective. It was unexpected that lowering the level of Me$_5$TAEA-PO and adding dipropoxylate would improve the blowing selectivity of Tetramine-2. Thus mixtures containing at least about 5 wt % Me$_5$TAEA-PO and, optionally, dipropoxylated tetramines are effective blowing catalyst compositions.

STATEMENT OF INDUSTRIAL APPLICATION

The present invention provides hydroxy-functional tertiary amine urethane catalysts for use in making polyurethane foams.

We claim:

1. In a method for preparing a polyurethane foam which comprises reacting an organic polyisocyanate and a polyol in the presence of a blowing agent, cell stabilizer and a catalyst composition, the improvement which comprises employing a catalyst composition consisting essentially of at least one of the permethylated mono- and dialkylene oxide adducts of tris(2-aminoethyl)amine of structures I, II and III:

$$(Me_2NCH_2CH_2)_2NCH_2CH_2N\underset{\underset{Me}{|}}{-}\underset{\underset{R}{|}}{C}H_2CHOH \quad I$$

$$Me_2NCH_2CH_2N(CH_2CH_2N\underset{\underset{Me}{|}}{-}\underset{\underset{R}{|}}{C}H_2CHOH)_2 \quad II$$

$$(Me_2NCH_2CH_2)_2NCH_2CH_2N\underset{\underset{R}{|}}{-}(CH_2CHOH)_2 \quad III$$

wherein

R is hydrogen or a C$_1$–C$_4$ alkyl.

2. The method of claim 1 in which R is methyl.

3. The method of claim 1 in which the catalyst composition consists essentially of compound I.

4. The method of claim 1 in which the catalyst composition is used in combination with at least one permethylated monoalkylene oxide adduct or polyalkylene oxide adduct of linear triethylenetetramine.

5. The method of claim 1 in which the catalyst composition is used in combination with at least one permethylated dialkylene oxide adduct of linear triethylenetetramine.

6. The method of claim 1 in which the catalyst composition is used in combination with a tertiary amine, organotin or carboxylate urethane catalyst.

7. In a method for preparing a polyurethane foam which comprises reacting an organic polyisocyanate and a polyol in the presence of water as a blowing agent, cell stabilizer and a catalyst composition, the improvement which comprises employing a catalyst composition consisting essentially of at least one of the permethylated mono- and dialkylene oxide adducts of tris(2-aminoethyl)amine of structures I, II and III:

$$(Me_2NCH_2CH_2)_2NCH_2CH_2N\underset{\underset{Me}{|}}{-}\underset{\underset{R}{|}}{C}H_2CHOH \quad I$$

$$Me_2NCH_2CH_2N(CH_2CH_2N\underset{\underset{Me}{|}}{-}\underset{\underset{R}{|}}{C}H_2CHOH)_2 \quad II$$

$$(Me_2NCH_2CH_2)_2NCH_2CH_2N\underset{\underset{R}{|}}{-}(CH_2CHOH)_2 \quad III.$$

8. The method of claim 7 in which the catalyst composition consists essentially of compound I.

9. The method of claim 7 in which the catalyst composition is used in combination with at least one permethylated monoalkylene oxide or polyalkylene oxide adduct of linear triethylenetetramine.

10. The method of claim 7 in which the catalyst composition is used in combination with a tertiary amine, organotin or carboxylate urethane catalyst.

* * * * *